United States Patent
Enomoto et al.

(10) Patent No.: US 6,340,203 B2
(45) Date of Patent: Jan. 22, 2002

(54) FRONT PILLAR FOR A VEHICLE

(75) Inventors: Kouji Enomoto; Suguru Yoshida, both of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/728,118

(22) Filed: Dec. 4, 2000

(30) Foreign Application Priority Data

Dec. 3, 1999 (JP) .......................................... 11-345532

(51) Int. Cl.⁷ ................................................ B60J 7/00
(52) U.S. Cl. ................... 296/203.02; 296/205; 296/189
(58) Field of Search ........................ 296/203.02, 205, 296/189

(56) References Cited

U.S. PATENT DOCUMENTS

| | | | | |
|---|---|---|---|---|
| 5,163,730 A | * | 11/1992 | Welch | 296/189 |
| 5,575,500 A | * | 11/1996 | Mimura et al. | 296/189 |
| 5,660,426 A | * | 8/1997 | Sugimori et al. | 296/189 |
| 5,720,510 A | * | 2/1998 | Daniel et al. | 296/189 |
| 5,762,392 A | * | 6/1998 | Suga | 296/189 |
| 5,803,532 A | * | 9/1998 | Karuppaswamy et al. | 296/189 |
| 5,836,641 A | * | 11/1998 | Sugamoto et al. | 296/189 |
| 5,868,458 A | * | 2/1999 | Hirata et al. | 296/189 |
| 5,941,597 A | * | 8/1999 | Horiuchi et al. | 296/205 |
| 5,988,733 A | * | 11/1999 | Kamo et al. | 296/189 |
| 5,992,924 A | * | 11/1999 | Noritake et al. | 296/189 |

FOREIGN PATENT DOCUMENTS

| | | | | |
|---|---|---|---|---|
| DE | 0040116730 | * | 11/1991 | 296/205 |
| JP | A-9-39833 | | 2/1997 | |

* cited by examiner

*Primary Examiner*—Joseph D. Pape
*Assistant Examiner*—Kiran B. Patel
(74) *Attorney, Agent, or Firm*—Arent Fox Kintner Plotkin & Kahn, PLLC

(57) ABSTRACT

An outer panel is made thinner than an inner panel, and a rear face facing a front door is folded so as to form a valley groove hollowed toward the interior of a tube constituted by true outer panel and the inner panel, whereby when a large magnitude of external force is applied to a front face in a rearward direction, the outer panel is allowed to be deformed more largely than the inner panel to thereby collapse the valley groove, whereby the rearward travel of the rear face can be reduced.

10 Claims, 6 Drawing Sheets

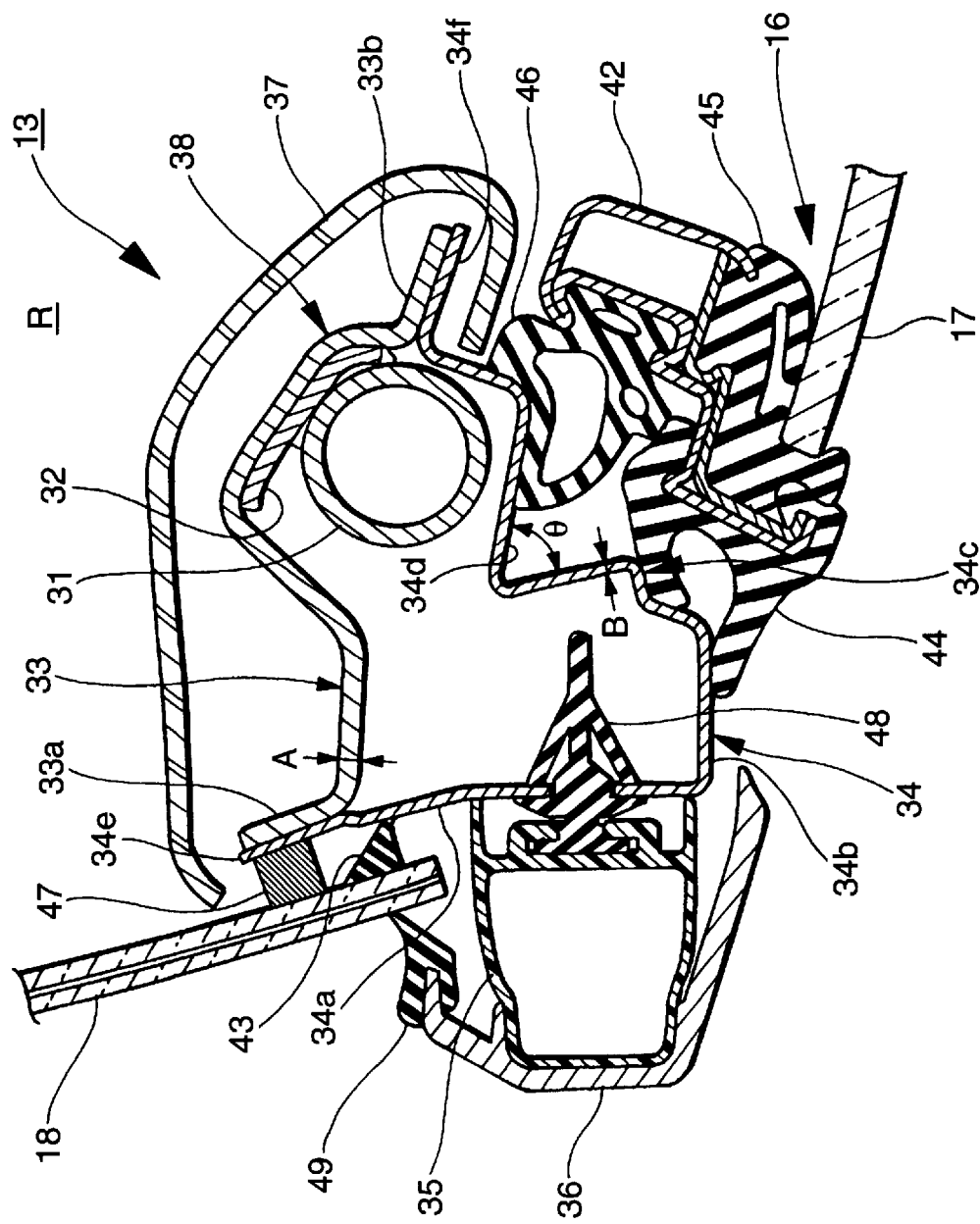

FRONT PILLAR FOR A VEHICLE

BACKGROUND OF THE INVENTION

1. Field of the Invention

The present invention relates to a front pillar for a vehicle which is preferably prevented from interfering with a front door while being deformed so as to absorb an impact applied thereto.

2. Description of the Related Art

There is known a front pillar for a vehicle which is designed to be deformed when an object collides thereagainst to thereby absorb an impact generated by the collision. For example, there is described such a front pillar for a vehicle in JP-A-9-39833.

FIG. 7 is a cross-sectional view of the related art front pillar shown in this publication. A front pillar 200 includes a pillar main body 203 formed into a tube-like body by joining a pillar inner 201 with a pillar outer 202 and a substantially U-shaped impact absorbing panel 204 acting to absorb an impact which is attached to the front face of the pillar main body 203 with an opening side thereof being oriented toward the pillar main body 203.

Here, reference numeral 206 denotes a resin garnish; 207: a windshield; 208: a sealant; 211: a window sash; 212, 213: weather strips; and 214: a window glass of a front door.

Referring to FIG. 8, the function of the front pillar 200 will be described. FIG. 8 is a functional diagram for explaining the function of the related art front pillar.

When an object collides against the front pillar 200 from the front of a vehicle, an external force is applied to the impact absorbing panel 204 via the resin garnish 206, whereby the impact absorbing panel 204 is deformed.

This relaxes an impact force that is to be transmitted to the pillar main body 203, but, for example, in the event that the impact absorbing panel 204 interferes with the window sash 211 while being deformed, the impact absorbing panel 204 is prevented from being deformed further.

As a result of this, it is conceived that the impact force applied to the impact absorbing panel 204 is not fully absorbed, whereby the impact is transmitted to the pillar main body 203 and the window sash 211.

Additionally, with a door having no window sash or a so-called "sash-less" window, the deformation of the impact absorbing panel 204 is prevented similarly by a window glass (which corresponds to the window glass 214), and therefore it is predicted that the impact is transmitted to the window glass of the door.

SUMMARY OF THE INVENTION

The present invention was made to cope with this, and an object thereof is to provide a front pillar for a vehicle which is prevented from interfering with a front door while being deformed to thereby effectively absorb and relax an impact.

With a view to attaining the object, according to an aspect of the invention, there is provided a front pillar for a vehicle which is formed into a tube by joining an inner panel to an outer panel from a passenger compartment side, the outer panel being constituted by a front face which is substantially parallel with a windshield, an external side face which is formed by bending the front face in such a manner as to be substantially parallel with a window glass of a front door and a rear face which is formed by bending the external side face toward the passenger compartment. The outer panel is made thinner than the inner panel, and wherein the rear face facing the front door is bent so as to form a valley groove which is hollowed toward the interior of the tube, so that when a large magnitude of external force is applied to the front face in a rearward direction, the outer panel is allowed to be deformed more largely than the inner panel to thereby collapse the valley groove, whereby the rearward travel of the rear face can be reduced.

When a large magnitude of external force acts in the rearward direction on the front face of the outer panel, which is made thinner than the inner panel and in which the rear face thereof facing the front door is bent so as to form therein the valley groove which is hollowed toward the interior of the tube, the rearward travel of the rear face is reduced by causing the outer panel to be deformed more largely than the inner panel to thereby collapse the valley groove.

As a result of this, the interference of the rear face of the outer panel of the front pillar with the front door can be prevented, whereby the deformation of the front pillar is not disturbed, thereby making it possible to effectively absorb the impact applied to the front pillar.

BRIEF DESCRIPTION OF THE DRAWINGS

FIG. 2 is a cross-sectional view of a front pillar taken along the line II—II in FIG. 1 according to a first embodiment of the present invention;

DETAILED DESCRIPTION OF THE PREFERRED EMBODIMENTS

Referring to the accompanying drawings, embodiments of the invention will be described below.

Figure 1:
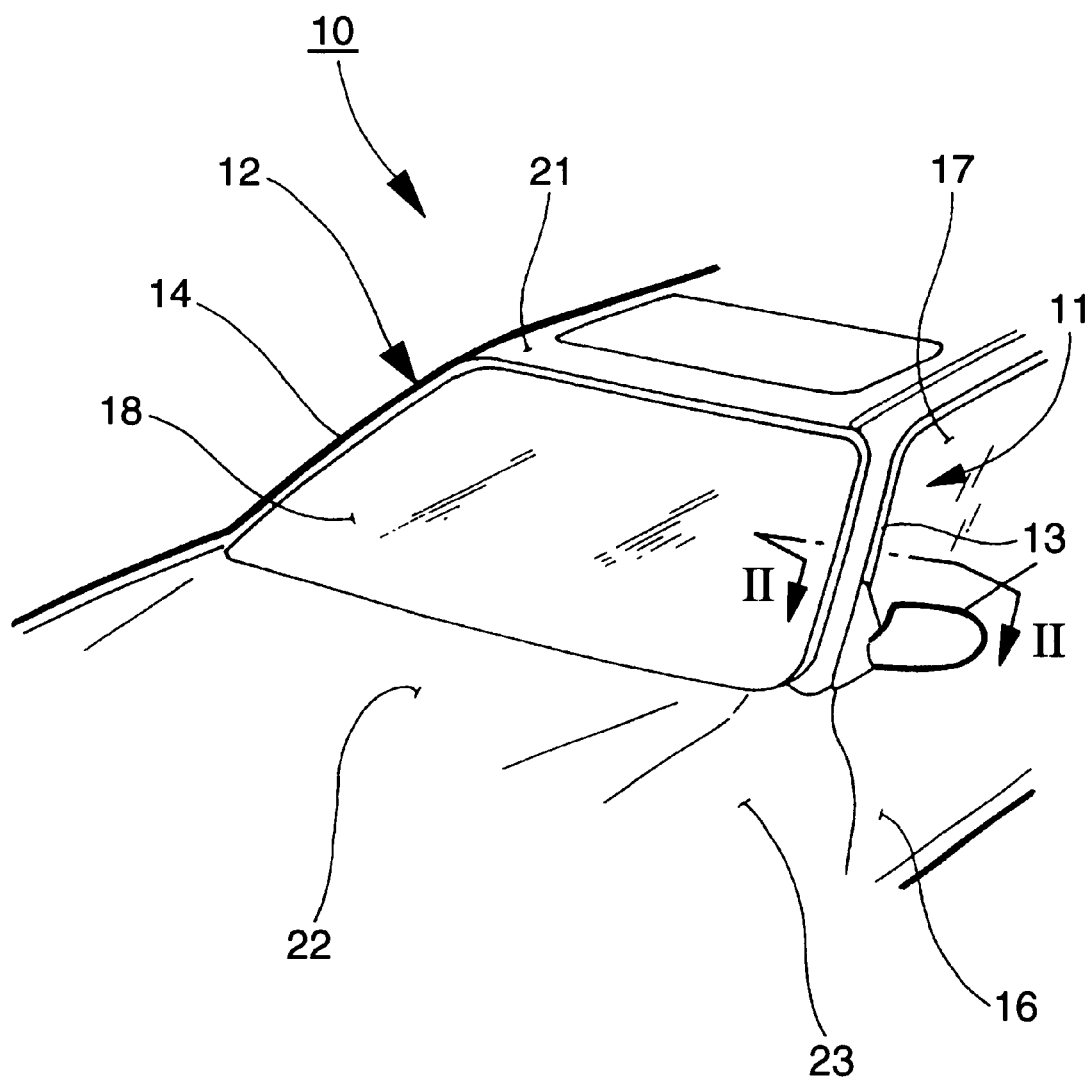
FIG. 1 is a perspective view of a main part of an automotive vehicle where a front pillar according to the invention is provided.

FIG. 1 is a perspective view showing a main part of an automotive vehicle where front pillars according to the invention are provided. An automotive vehicle 10 includes front pillars 13, 14 which constitute side bodies 11, 12, respectively. Reference numeral 16 denotes a front door; 17: a window glass of the front door 16; 18: a windshield; 21: a roof panel; 22: an engine hood; and 23: a front fender.

FIG. 2 is a cross-sectional view, taken along the line II—II in FIG. 1, of a front pillar according to a first embodiment of the invention.

The front pillar 13 includes a pillar frame 31 which constitutes a frame for the front pillar 13, a reinforcement member 32 attached to the pillar frame 31, a thicker inner panel 33 attached to the reinforcement member 32, a thinner outer panel 34 which is joined to the inner panel 33 to form a tube, an impact absorbing member 35 attached to a front face 34a of the outer panel 34, a cover member 36 attached to a distal end portion of the impact absorbing member 35 and a pillar garnish 37 adapted to cover a passenger compartment side of the inner panel 33.

The pillar frame 31, reinforcement member 32, inner panel 33 and outer panel 34 constitute a pillar main body 38.

Here, reference numeral 42 denotes a window sash for the front door 16; 43, 44, 45, 46: weather strips; 47: a sealant; 48: a snap; and 49: a molding.

The reinforcement member 32 is a steel sheet member for reinforcing the inner panel 33. The inner panel is a steel bending member having a sufficient rigidity, and flange portions 33a, 33b are formed at ends thereof. It is assumed that the thickness of the inner panel 33 is A.

The outer panel 34 is a bending member of steel, in which the front face 34a which is substantially parallel with the windshield 18 is bent so as to be substantially parallel with the window glass 17 to thereby form an external side face 34b. The external side face 34b is then bent toward a passenger compartment R side to thereby form a rear face 34c. The thickness of the outer panel 34 is made thinner to reduce the rigidity thereof, and to promote deformation by an external force, a valley groove 34d is formed by bending the rear face 34c at a sharp angle (an angle of •) toward the interior of the tube. The rear face 34c is caused to face the window sash 42 of the front door 16, and flange portions 34e, 34f are formed at end portions of the outer panel 34 so as to be welded to the flange portions 33a, 33b of the inner panel 33. If it is now assumed that the thickness of the outer panel 34 is B, B<A.

The impact absorbing member 35 is an extruded member of resin, which is easily deformed by an impact from the front of the vehicle to thereby absorb the impact.

The front pillar 14 shown in FIG. 1 is symmetrical with the front pillar 13 but is similar in construction to the front pillar 13 except that they are reversed transversely. The front pillar 14 also functions identically with the front pillar 13, and therefore, a description of the front pillar 14 will be omitted here.

Next, the function of the front pillar 13 described above will be described below.

Figure 3A:
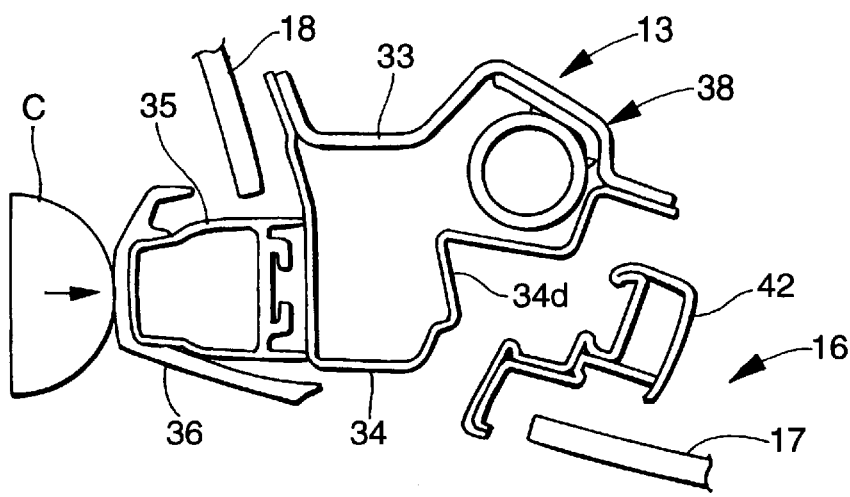
FIG. 3 is a functional diagram for explaining the function of the front pillar according to the invention.
Figure 3B:
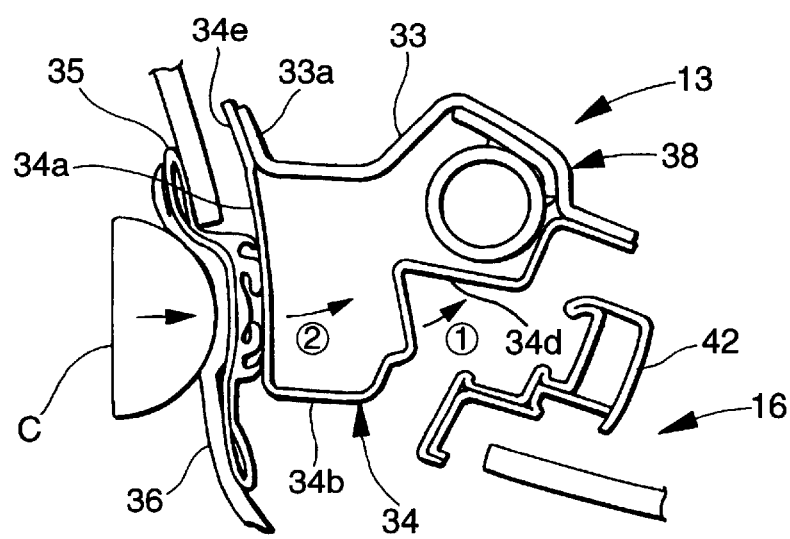
Figure 3C:
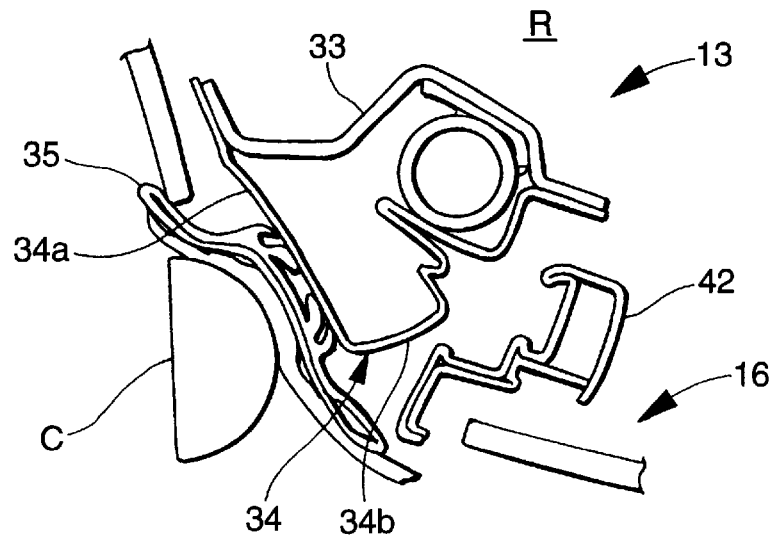

FIGS. 3A to 3C are explanatory diagrams for explaining the function of the front pillar according to the invention.

In FIG. 3A, when an object C collides against the front pillar 13 from the front of the vehicle, as shown in FIG. 3B, an impact force first acts on the impact absorbing member 35, which is then easily deformed to thereby partially relax the impact.

Next, the outer panel 34 is deformed mainly at the valley groove 34d by virtue of the impact force acting on the pillar main body 38 from the impact absorbing member 35, or the external force acing on the front face 34a of the outer panel 34 in the rearward direction.

In other words, since the inner panel 33 is not substantially deformed due to its high rigidity, the valley groove 34d in the outer panel 34 is collapsed as indicated by an arrow ①, and in conjunction with this, the front face 34a and the external side face 34b start to be deformed in such a manner that the faces swing in a direction indicated by an arrow ② about a joined portion where the flange portion 33a and the flange portion 34e are joined together.

In FIG. 3C, as the outer panel continues to be deformed progressively, following the deformation mode described above, the external side face 34b of the outer panel 34 enters into the passenger compartment R side of the window sash 42 of the front door 16 and therefore there is no risk of the external side face 34b interfering with the window sash 42. In other words, the interference of the front pillar 13 with the front door 16 can be prevented.

Consequently, the impact can effectively be relaxed by the front pillar 13.

Thus, as described with respect to FIGS. 2 to 3C, the present invention provides the front pillar 13 which is formed into a tube by joining the inner panel 33 to the outer panel 34 from the passenger compartment R side, the outer panel 34 being constituted by the front face 34a which is substantially parallel with the windshield 18, the external side face 34b which is formed by bending the front face 34a in such a manner as to be substantially parallel with the window glass 17 of the front door 16 and the rear face 34c which is formed by bending the external side face 34b toward the passenger compartment R. The outer panel 34 is made thinner than the inner panel 33, and the rear face 34c facing the front door 16 is bent so as to form the valley groove 34d which is hollowed toward the interior of the tube, so that when a large magnitude of external force is applied to the front face 34a in a rearward direction, the outer panel 34 is allowed to be deformed more largely than the inner panel 33 to thereby collapse the valley groove 34d, whereby the rearward travel of the rear face 34c can be reduced.

According to the above construction, the rear faces 34c of the outer panels 34 of the front pillars 13, 14 can be prevented from interfering with the front doors 16, and therefore, since there is no risk of the deformation of the front pillar 13 being interrupted, the impact applied to the front pillar 13 can be effectively absorbed and relaxed.

Figure 4:
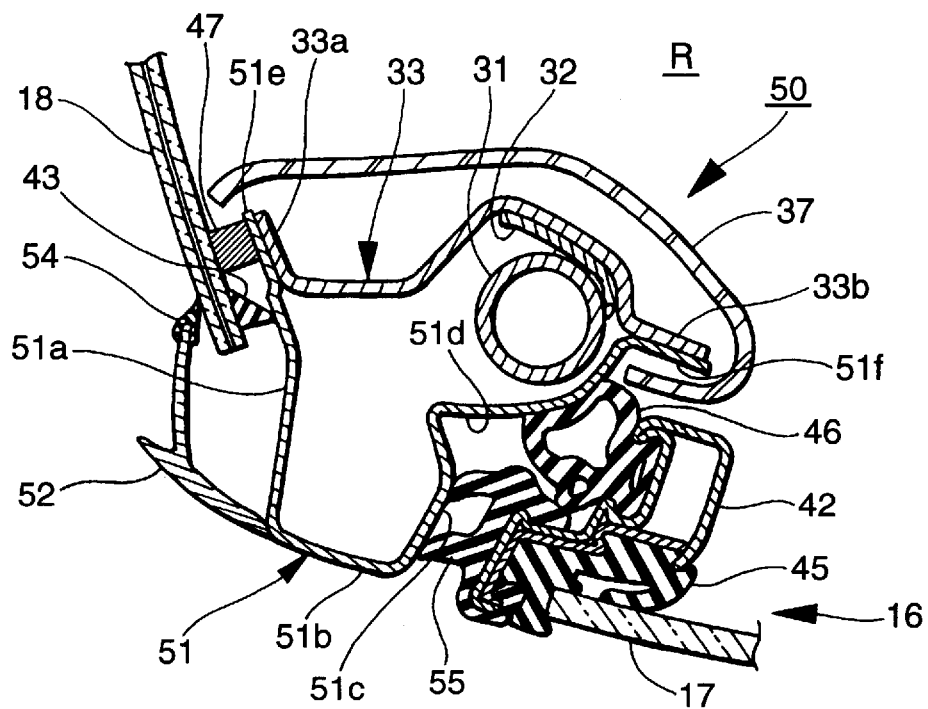
FIG. 4 is a cross-sectional view of a front pillar according to a second embodiment of the invention.

FIG. 4 is a cross-sectional view of a front pillar according to a second embodiment of the invention, in which like reference numerals are given to like constituent components to those of the first embodiment shown in FIG. 2, and the description thereof will be omitted.

A front pillar 50 includes a pillar frame 31, a reinforcement member 32, an inner panel 33, a thinner outer panel 51 adapted to form a tube when joined to the inner panel 33, a cover member 52 for covering a front face 51a of the outer panel 51 and an end portion of a windshield 18 and a pillar garnish 37. Note that reference numeral 54 denotes a molding, reference numeral 55 denoting a weather strip.

The outer panel 51 is a bending member of steel, in which the front face 51a which is substantially parallel with the windshield 18 is bent so as to be substantially parallel with the window glass 17 to thereby form an external side face 51b. The external side face 51b is then bent toward a passenger compartment R side to thereby form a rear face 51c. The thickness of the outer panel 51 is made thinner than to the inner panel 33 to reduce the rigidity thereof, and to promote deformation by an external force, a valley groove 51d is formed by bending the rear face 51c at a sharp angle toward the interior of the tube. Flange portions 51e, 51f are formed at end portions of the outer panel 51 so as to be welded to the flange portions 33a, 33b of the inner panel 33.

Figure 5:
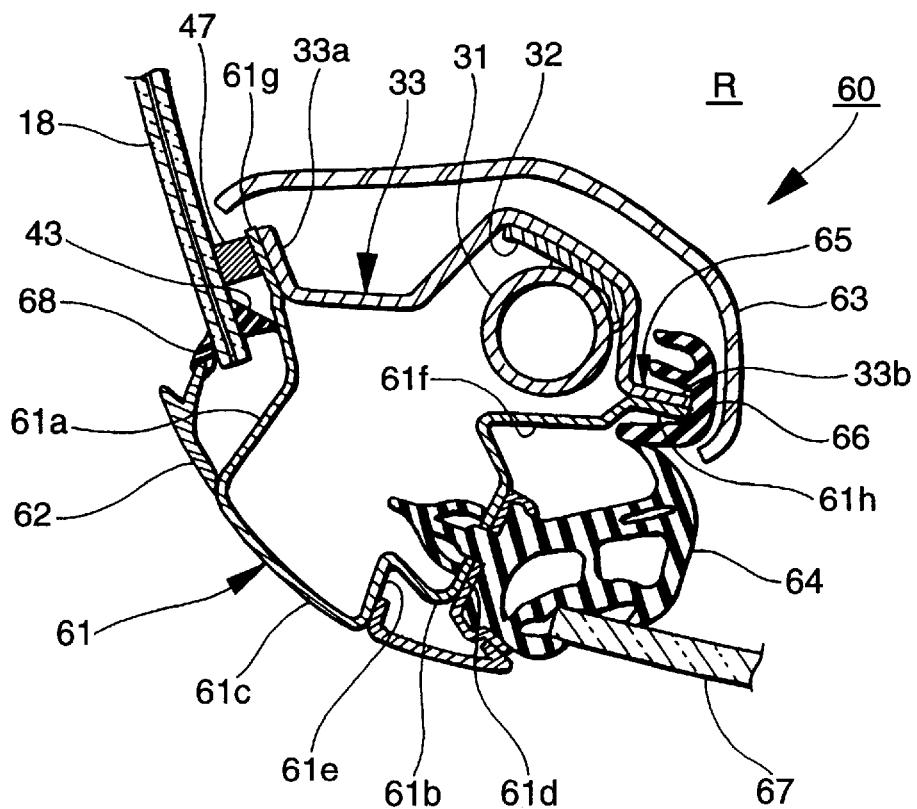
FIG. 5 is a cross-sectional view of a front pillar according to a third embodiment of the invention.

FIG. 5 is a cross-sectional view of a front pillar according to a third embodiment of the invention, in which like reference numerals are given to like constituent components to those of the first embodiment shown in FIG. 2, and the description thereof will be omitted.

A front pillar 60 includes a pillar frame 31, a reinforcement member 32, an inner panel 33, a thinner outer panel 61 adapted to form a tube when joined to the inner panel 33, a cover member 62 for covering a front face 61a of the outer panel 61 and an end portion of a windshield 18, a pillar garnish 63, a weather strip 64 attached to the rear face 61b of the outer panel 61, and a weather strip 66 attached to a rear joined portion 65 where the inner panel 33 and the outer panel 61 are joined together, with the rear face 61b being caused to face a window glass 67 of a sash-less type window or a window without a sash of a front door (not shown). Note that reference numeral 68 denotes a molding.

The outer panel 61 is a bending member of steel, in which the front face 61a which is substantially parallel with the windshield 18 is bent so as to be substantially parallel with the window glass 17 to thereby form an external side face 61c. The external side face 61c is then bent toward a passenger compartment R side to thereby form a rear face 61b, where a flat portion 61d is provided. The thickness of the outer panel 61 is made thinner than the inner panel 33 to reduce the rigidity thereof, and to promote deformation by an external force, a first valley groove 61e and a second valley groove 61f are formed at sides of the flat portion 61d, which first valley groove 61e and second valley groove 61f are bent at a sharp angle toward the interior of the tube. Flange portions 61g, 61h are formed at end portions of the outer panel 61 so as to be welded to the flange portions 33a, 33b of the inner panel 33.

As is described above, when a large external force acts on the front face 61a of the outer panel 61 in a rearward direction, the outer panel 61 can be allowed to be deformed more largely than the inner panel 33 by forming the two valley grooves, which are the first valley groove 61e and the second valley groove 61f, in the rear face 61b, whereby the outer panel 61 is allowed to enter into the passenger compartment R side of the window glass 67 of the front door, thereby making it possible to more positively prevent the front pillar 60 from interfering with the window glass 67. Thus, since the deformation of the front pillar 60 is not prevented, the impact applied to the front pillar 60 can effectively be absorbed and relaxed.

Figure 6:
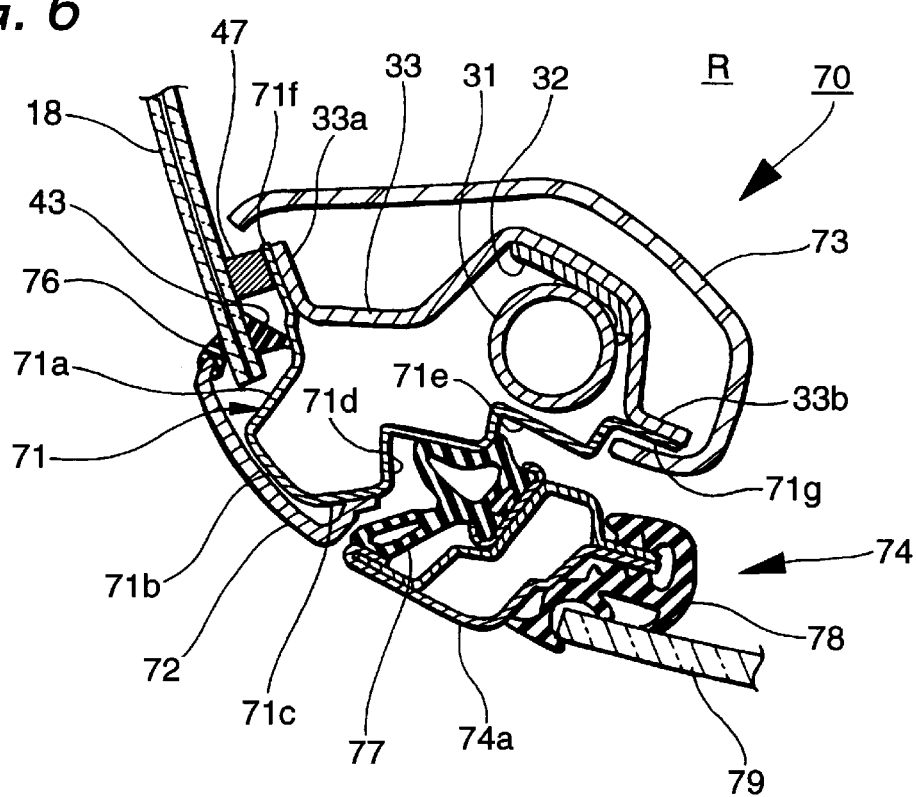
FIG. 6 is a cross-sectional view of a front pillar according to a fourth embodiment of the invention.
Figure 7:
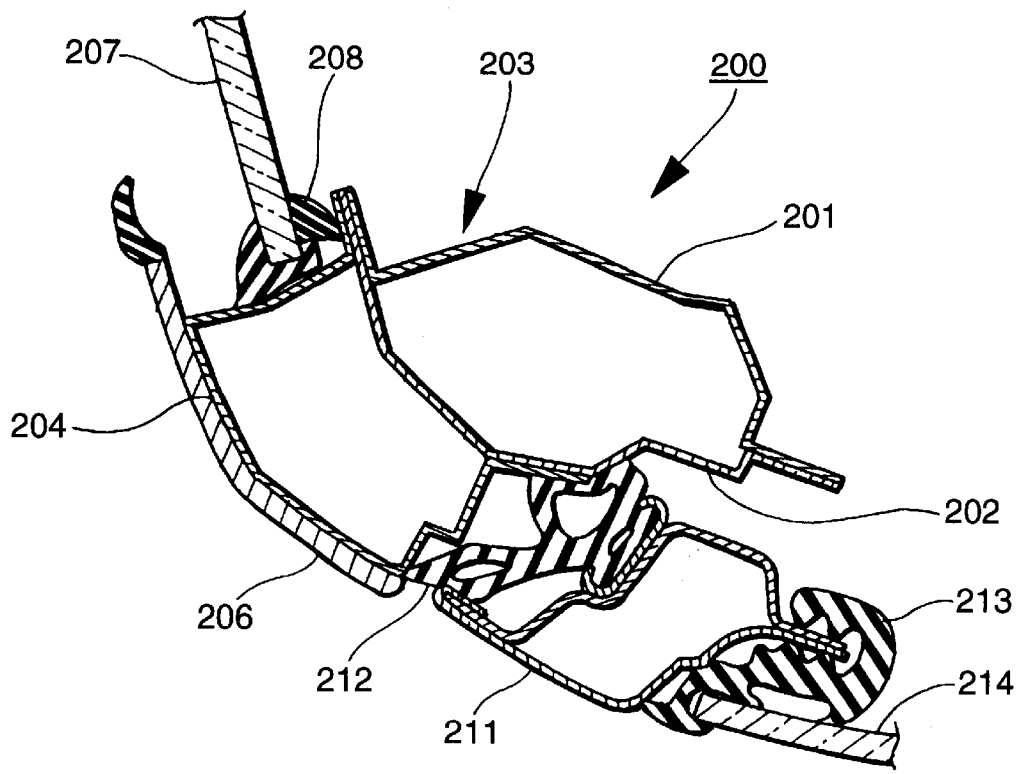
FIG. 7 is a cross-sectional view showing a related art front pillar.
Figure 8:
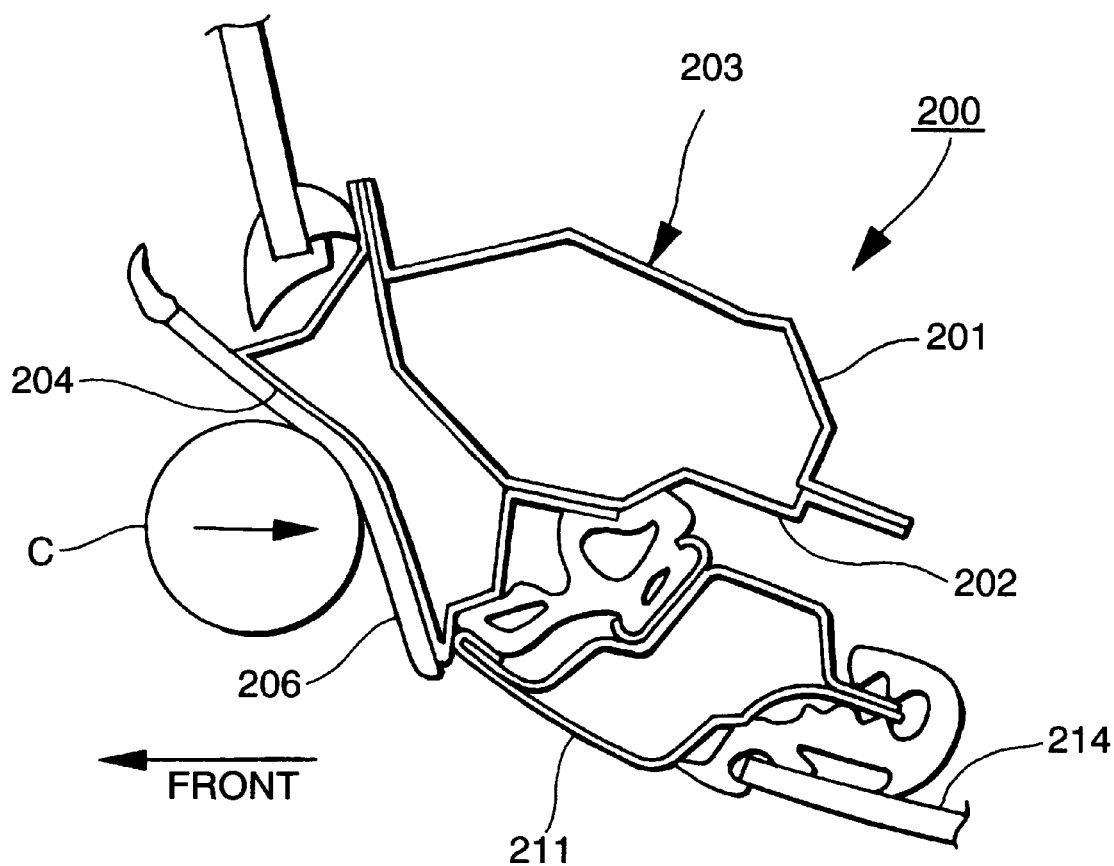
FIG. 8 is a functional diagram for explaining the function of the related art front pillar.

FIG. 6 is a cross-sectional view of a front pillar according to a fourth embodiment of the invention, in which like reference numerals are given to like constituent components to those of the first embodiment shown in FIG. 2, and the description thereof will be omitted.

A front pillar 70 includes a pillar frame 31, a reinforcement member 32, an inner panel 33, a thinner outer panel 71 adapted to form a tube when joined to the inner panel 33, a cover member 72 for covering a front face 71a, an external side face 71b and a part of a rear face 71c of the outer panel 71 and an end portion of a windshield 18, and a pillar garnish 73, with the rear face 71c being caused to face a window sash portion 74a of a fully framed-type of a front door 74. Note that reference numeral 76 denotes a molding; 77, 78: weather strips; and 79: a window glass of the front door 74.

The outer panel 71 is a bending member of steel, in which the front face 71a which is substantially parallel with the windshield 18 is bent so as to be substantially parallel with the window glass 17 to thereby form an external side face 71b. The external side face 71b is then bent toward a passenger compartment R side to thereby form a rear face 71c. The thickness of the outer panel 71 is made thinner than the inner panel 33 to reduce the rigidity thereof, and to promote deformation by an external force, a first valley groove 71d and a second valley groove 71e are formed successively in the rear face 71c, which first valley groove 71d and second valley groove 71e are bent at a sharp angle toward the interior of the tube. Flange portions 71f, 71g are formed at end portions of the outer panel 71 so as to be welded to the flange portions 33a, 33b of the inner panel 33.

As is described above, as with the front pillar 60 shown in FIG. 5, the outer panel 71 can be allowed to be deformed more largely in a bellows-like fashion than the inner panel 33 by forming the two valley grooves, which are the first valley groove 71d and the second valley groove 71e, successively in the rear face 71c, whereby the outer panel 71 is allowed to enter into the passenger compartment R side of the front door 74, thereby making it possible to more positively prevent the front pillar 70 from interfering with the front door 74.

Note that while the front face, external side face and rear face are formed on the outer panel of the front pillar in the present invention, the present invention is not limited to the construction, but a construction may be adopted in which the front face and the external side face are formed as a single flat or curved face, which is then bent toward the passenger compartment side to form a rear face, where a valley groove or grooves may be formed.

In addition, in the present invention, while the valley groove is a V-shaped groove formed by two straight lines is applied, the present invention is not limited to the construction, but the groove may be formed as a groove having a cross section constituted by two curved lines (for example, a groove having a U-shaped cross section) or a groove having a cross section constituted by a straight line and a curved line.

According to the above constructions, the invention is advantageous as below.

With the front pillar for the vehicle according to the aspect of the invention, the outer panel is made thinner than the inner panel, and the rear face of the outer panel which faces the front door is bent so as to form therein the valley groove or grooves in such a manner as to be hollowed toward the interior of the tube, whereby when a large magnitude of external force acts on the front pillar in the rearward direction, the outer panel is allowed to be deformed more largely than the inner panel to thereby collapse the valley groove or grooves, so that the rearward travel of the rear face can be reduced. This prevents the rear face of the outer panel of the front pillar from interfering with the front door, and therefore nothing interrupts the deformation of the front pillar, thereby making it possible to effectively absorb and relax the impact applied to the front pillar.

What is claimed is:

1. A front pillar assembly for a vehicle, comprising:

an inner panel disposed on a passenger compartment side; and an outer panel joined to said inner panel so as to form a tube, said outer panel being made thinner than said inner panel, said outer panel including:

a front face substantially parallel with a windshield;

an external side face which is formed by bending said front face in such a manner as to be substantially parallel with a window glass of a front door; and a rear face which is formed by bending said external side face toward the passenger compartment such as to face said front door, said rear face defining at least one valley groove which is hollowed toward the interior of said tube.

2. The front pillar assembly according to claim 1, wherein said valley groove comprises a first valley groove and a second valley groove formed at both sides of a flat portion of said rear face.

3. The front pillar assembly according to claim 1, wherein said valley groove is a V-shaped groove bent at a sharp angle.

4. The front pillar assembly according to claim 1, wherein, when said valley groove is deformed by an external force in a rearward direction, said external side face are deformed toward the passenger compartment side.

5. A front pillar assembly for a vehicle, comprising:
an inner panel disposed on a passenger compartment side; and
an outer panel joined to said inner panel so as to form a tube, said outer panel being made thinner than said inner panel, said outer panel including:
a first face extending from the vicinity of an end of a windshield toward a window glass of a front door;
a second face which is formed by bending said first face so as to be parallel with the window glass, and a third face formed by bending said second face toward the passenger compartment such as to face said front door, said third face defining a valley groove which is hollowed toward the interior of said tube.

6. The front pillar assembly according to claim 5, wherein said first face includes:
a front face substantially parallel with the windshield; and
an external side face which is formed by bending said front face in such a manner as to be substantially parallel with the window glass of the front door.

7. The front pillar assembly according to claim 6, wherein said front face and said external side face are formed in a continuously curved shape.

8. The front pillar assembly according to claim 5, wherein said valley groove comprises a first valley groove and a second valley groove formed at both sides of a flat portion of said second face.

9. The front pillar assembly according to claim 5, wherein said valley groove is a V-shaped groove bent at a sharp angle.

10. The front pillar assembly according to claim 5, wherein, when said valley groove is deformed by an external force in a rearward direction, said first face are deformed toward the passenger compartment side.

* * * * *